(12) United States Patent
Swenson

(10) Patent No.: US 9,227,349 B2
(45) Date of Patent: Jan. 5, 2016

(54) METHOD OF MOLDING A MULTI-LAYER ARTICLE

(75) Inventor: Paul M. Swenson, South Hamilton, MA (US)

(73) Assignee: Kortec, Inc., Rowley, MA (US)

( * ) Notice: Subject to any disclaimer, the term of this patent is extended or adjusted under 35 U.S.C. 154(b) by 375 days.

(21) Appl. No.: 13/184,137

(22) Filed: Jul. 15, 2011

(65) Prior Publication Data

US 2012/0015122 A1    Jan. 19, 2012

Related U.S. Application Data

(60) Provisional application No. 61/365,303, filed on Jul. 16, 2010.

(51) Int. Cl.
| | |
|---|---|
| B29C 45/16 | (2006.01) |
| B32B 27/08 | (2006.01) |
| B32B 27/30 | (2006.01) |
| B29L 31/00 | (2006.01) |
| B32B 1/02 | (2006.01) |

(52) U.S. Cl.
CPC ......... B29C 45/1642 (2013.01); B29C 45/1603 (2013.01); B32B 27/08 (2013.01); B32B 27/306 (2013.01); B29C 2045/1614 (2013.01); B29C 2945/76545 (2013.01); B29C 2945/76595 (2013.01); B29C 2945/76765 (2013.01); B29C 2945/76859 (2013.01); B29K 2995/0067 (2013.01); B29K 2995/0069 (2013.01); B29L 2031/712 (2013.01); B32B 1/02 (2013.01); B32B 2323/10 (2013.01); B32B 2367/00 (2013.01); Y10T 428/1383 (2015.01)

(58) Field of Classification Search
None
See application file for complete search history.

(56) References Cited

U.S. PATENT DOCUMENTS

| | | |
|---|---|---|
| 2,418,856 A | 4/1947 | Stacey |
| 3,339,240 A | 9/1967 | Corbett |

(Continued)

FOREIGN PATENT DOCUMENTS

| | | |
|---|---|---|
| EP | 0311160 A2 | 4/1989 |
| EP | 0419829 A3 | 11/1991 |

(Continued)

OTHER PUBLICATIONS

International Preliminary Report on Patentability for International Application No. PCT/US2011/044222 dated Jan. 22, 2013 (8 pages).

(Continued)

*Primary Examiner* — Edmund Lee
(74) *Attorney, Agent, or Firm* — McCarter & English, LLP; David R. Burns

(57) ABSTRACT

A molded multi-layer article has an interior layer contained within inner and outer layers. The article is molded by co-injecting the inner, outer, and interior layer materials into a mold defining a cavity. The interior layer material is caused to flow along a steam line offset from the zero velocity gradient of the combined material flow in a manner so that the interior layer material flow stream does not flow along or cross the zero velocity gradient yet has a greater flow velocity than the average flow velocity of the combined flow front. These methods and apparatus can mold four or more multilayer articles at once, each having an interior layer extending throughout 95% or more of the sealable portion of the article. The interior layer of a resultant article can extend throughout 99% or more of the sealable portion of the article.

21 Claims, 13 Drawing Sheets

(56) References Cited

U.S. PATENT DOCUMENTS

| | | | |
|---|---|---|---|
| 3,679,119 | A | 7/1972 | Copping |
| 3,894,823 | A * | 7/1975 | Hanning ............... 425/130 |
| 3,944,124 | A | 3/1976 | Hexel |
| 4,174,413 | A | 11/1979 | Yasuike et al. |
| 4,554,190 | A | 11/1985 | McHenry et al. |
| 4,568,261 | A | 2/1986 | McHenry et al. |
| 4,751,035 | A | 6/1988 | McHenry et al. |
| 4,946,365 | A | 8/1990 | Kudert et al. |
| 4,990,301 | A | 2/1991 | Krishnakumar et al. |
| 5,433,910 | A | 7/1995 | Mukai et al. |
| 5,914,138 | A * | 6/1999 | Swenson ............... 425/130 |
| 6,180,042 | B1 | 1/2001 | Takeuchi et al. |
| 6,596,213 | B2 * | 7/2003 | Swenson ............... 264/255 |
| 6,787,097 | B1 | 9/2004 | Homann et al. |
| 6,908,581 | B2 | 6/2005 | Sabin et al. |
| 2002/0192404 | A1 | 12/2002 | Swenson |
| 2003/0124209 | A1 | 7/2003 | Swenson |
| 2004/0265422 | A1 | 12/2004 | Sabin et al. |
| 2009/0152280 | A1 | 6/2009 | Luburic |
| 2009/0285929 | A1 | 11/2009 | Diamantakos et al. |
| 2010/0044916 | A1 | 2/2010 | Richards et al. |
| 2011/0217496 | A1 | 9/2011 | Swenson |

FOREIGN PATENT DOCUMENTS

| | | |
|---|---|---|
| EP | 0419829 | 4/1998 |
| JP | 05084787 | 4/1993 |
| JP | 06190860 | 7/1994 |
| JP | 06190860 A | 7/1994 |
| JP | 6278164 A | 10/1994 |
| JP | 2000084976 A | 3/2000 |
| JP | 2008307846 A | 12/2008 |
| WO | 02081172 A1 | 10/2002 |
| WO | WO03/064133 | 8/2003 |
| WO | WO2005018909 | 3/2005 |
| WO | 2007006163 A1 | 1/2007 |
| WO | WO2007006163 | 1/2007 |
| WO | WO2011112613 | 9/2011 |

OTHER PUBLICATIONS

Eigl, F.A. et al., "Mehr Verständnis für den Kern," 88:1 Kunststoffe 46-50 (Carl Hanser Verlag, Munich) (Jan. 1, 1998) (German), translated as F.A. Eigl et al., "A Better Understanding of the Core," 88:1 Kunststoffe 14-16 (Jan. 1, 1998).

Naitove, Matthew H., "Multi-Layer Injection Molded Tubs Take on Thermoforming & Metal Cans," Plastics Technology, May 2011, (2 pages), available at http://www.ptonline.com/articles/multi-layer-injection-molded-tubs-take-on-thermoforming-metal-cans.

F.A. Eigl et al., "Mehr Verständnis für den Kern," 88:1 Kunststoffe 46-50 (Carl Hanser Verlag, Munich) (Jan. 1, 1998) (German), translated as F.A. Eigl et al., "A Better Understanding of the Core," 88:1 Kunststoffe 14-16 (Jan. 1, 1998).

International Search Report and Written and Opinion of the International Searching Authority for International Application No. PCT/US2011/044222, mailed Nov. 24, 2011.

Notification of First Office Action and First Office Action by The State Intellectual Property Office of P.R. China for Chinese Application 201180035035.3 dated Oct. 10, 2014 (8 pages).

Japanese Office Action dated Feb. 24, 2015 from the Japanese Patent Office for Japanese Patent Application No. 2013-5419854 (4 pages with English translation).

* cited by examiner

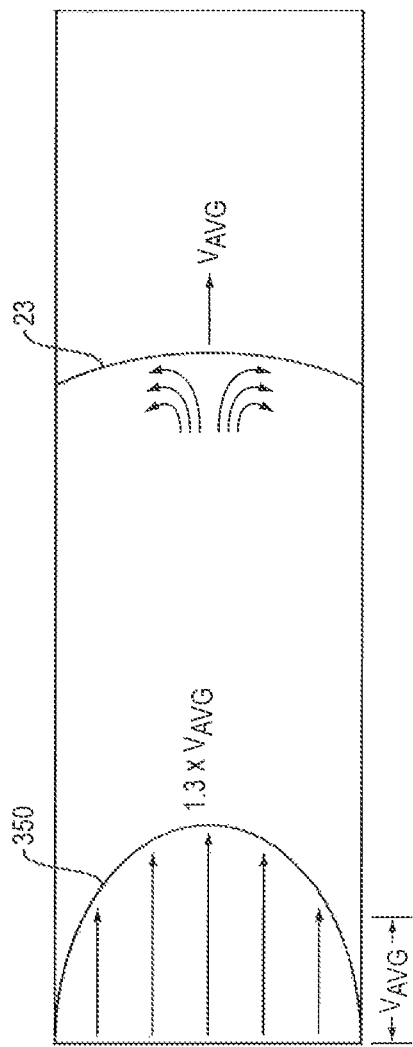

US 9,227,349 B2

METHOD OF MOLDING A MULTI-LAYER ARTICLE

RELATED APPLICATION

The present application is related to and claims priority to U.S. Provisional Patent Application No. 61/365,303 filed on Jul. 16, 2010, the entire contents of which are incorporated herein by reference.

FIELD OF THE INVENTION

The present invention relates to multi-layer injection molded products. In particular, the invention relates to multi-layer molded products having gas impermeability or gas scavenger characteristics.

BACKGROUND INFORMATION

Injection molded articles are used for a variety of purposes. Plastic injection molded products are commonly made from materials such as polyethylene (PET) or polypropylene (PP). These products resist environmental degradation, and are reasonably durable, watertight, and economically produced.

However, plastic materials such as PET and PP are gas (e.g., oxygen, nitrogen, etc.) permeable. For applications in which gas permeability is undesirable, for example, food products, medicines and products that degrade upon gaseous exposure, a barrier material or scavenger material is co-injected with the plastic material. Typically, the barrier material, such as Ethyl Vinyl Alcohol (EVOH), is injected as an interior core material stream between an inner and outer flow stream of the PET or PP material stream, forming an EVOH interior layer inside the PET or PP skin to form the molded product. In order to prevent detrimental gas permeation, it is necessary that the interior barrier layer extend throughout substantially the entire portion of the molded article that is exposed. Even if a very small percentage of the exposed surface area lacks an adequate barrier layer, detrimental amounts of gas permeation may occur.

In order for the barrier layer to form throughout the molded article, it is necessary that the interior layer material flow to substantially the ends of the mold cavity during the molding process. If the interior layer material does not flow to the end of the cavity during molding, there will be an inadequate barrier layer at the corresponding "end" of the molded product. On the other hand, if the interior layer material flows too quickly, the interior layer material can penetrate or breakthrough the flow front or leading edge of the inner and outer layer material (i.e., skin), causing undesirable results. Thus, known techniques attempt to cause the interior layer material to flow to the ends of the mold cavity without breakthrough, e.g., by attempting to precisely control injection parameters, such as, for example, injection pressure, temperature, timing, injection location, etc.

Due to significant material flow disparities in non-symmetric mold cavities (i.e., non-symmetric molded articles), this co-injection process has until now been limited to products that are essentially symmetrical in shape. However, even symmetrical geometries, which theoretically have symmetrical flow characteristics throughout the mold cavity, have met with limited success. Systemic and process variations (e.g., manufacturing tolerances in mold cavity dimensions and surface finishes, local temperature variations, injection pressure variations, normally occurring streamline variations, limitations of calculation methodologies used, etc.) cannot be eliminated using current technology and can result in either breakthrough or "gaps" (or both) in barrier layer coverage. Thus, previously known techniques do not provide adequate and/or consistent permeability resistance.

Accordingly, there is a need for methods and apparatuses for forming injection molded articles having an interior layer where the interior layer extends sufficiently throughout the article to adequately prevent gas permeation without breakthrough. There is further a need for injection molded articles containing such a layer.

SUMMARY OF THE INVENTION

Embodiments taught herein address the aforementioned disadvantages of the prior art. Exemplary systems, methods and non-transitory computer readable programs are taught herein to cause an inner core of material to flow in a manner that results in a molded plastic article with barrier coverage extending between 95% and 100% of the entire surface area. Exemplary systems, methods and non-transitory computer readable programs can achieve the foregoing barrier coverage in production molding using molds that define four or more cavities, each corresponding to a resulting molded article, and even operating at typical commercial cycle times. The exemplary systems, methods and computer readable programs taught herein are well suited for use in forming symmetrical molded plastic articles and asymmetrical molded plastic articles with barrier coverage extending between 99% and 100% of the entire surface area of the sealable portion of the article.

In some embodiments, a plurality of multi-layer articles may be formed by a method of molding. The method may include injecting a first material into a mold defining a plurality of at least four cavities, each cavity configured to correspond with one of a plurality of at least four resulting multi-layer articles. The method may further include injecting a second material into the mold to form an inner layer and an outer layer of the plurality of articles. The method may include causing the first material to flow throughout the mold and form an interior layer of each of the plurality of articles, between the inner and outer layers, and extending through at least 95% of the sealable portion of each of the plurality of articles.

In some embodiments, an article may be formed by a method of molding. The method may include injecting a first material into a mold defining a cavity. The method may further include injecting a second material into the mold to form an inner layer and an outer layer of the article. The method may include causing the first material to flow throughout the mold and form an interior layer of the article, between the inner and outer layers, and extending through at least 99% of the sealable portion of the article.

In embodiments of each of the methods of molding, the mold cavity or cavities and/or the resulting molded article or articles may be symmetric. Embodiments of each of the methods of molding may include injecting the first and second materials into the mold cavity simultaneously. Embodiments of each of the methods may include injecting the first material into the mold so that it is offset from the zero velocity gradient of the combined flow of the first and second materials.

In some embodiments, a co-injection molding apparatus may include a mold, a plurality of nozzle assemblies, and a processor. The mold defines a plurality of at least four cavities, each cavity configured to correspond to one of a plurality of resulting symmetrical multi-layer articles. Each of the plurality of nozzle assemblies is configured to inject a first polymeric material into the corresponding one of the plurality of cavities to form an interior layer of one of the plurality of resulting symmetrical multi-layer articles. Each of the plurality of nozzle assemblies is further configured to inject a second polymeric material into the corresponding one of the plurality of cavities to form an inner layer and an outer layer of one of the plurality of resulting symmetrical multi-layer articles. The processor may be programmed to execute instructions to cause the first polymeric material to flow throughout the mold to provide each of the plurality of resulting multi-layer articles with an interior layer extending through at least 95% of the sealable portion of the article.

In some embodiments, a co-injection molding apparatus may include a mold defining a first cavity, a nozzle assembly, and a processor. The nozzle assembly may be configured to inject a first polymeric material into the first mold cavity to form an interior layer of a first resulting multi-layer article. The nozzle may be further configured to inject a second polymeric material into the first mold cavity to form an inner layer and an outer layer of the first resulting multi-layer article. The processor may be programmed to execute instructions to cause the first material to flow throughout the first mold cavity to provide the first resulting multi-layer article with an interior layer extending through at least 99% of the sealable portion of the article.

The mold of the foregoing apparatus may further define a plurality of cavities, each corresponding to one of a plurality of resulting symmetrical multi-layer articles. The foregoing apparatus may further include a plurality of nozzle assemblies, each corresponding to one of the plurality of cavities. Each of the plurality of nozzle assemblies is configured to inject the first polymeric material into the corresponding one of the plurality of cavities to form an interior layer of one of the plurality of resulting symmetrical multi-layer articles. Each of the plurality of nozzle assemblies is further configured to inject the second polymeric material into the corresponding one of the plurality of cavities to form an inner layer and an outer layer of one of the plurality of resulting symmetrical multi-layer articles. The processor of the foregoing apparatus may further be programmed to execute instructions to cause the first polymeric material to flow throughout the plurality of cavities to provide each of the plurality of resulting multi-layer articles with an interior layer extending through at least 99% of the sealable portion of the article.

In embodiments of each of the co-injection molding apparatus, the mold cavity or cavities and/or the molded article or articles may be symmetric. Embodiments of each of the molding apparatus may form as many as sixty-four multi-layer articles or more per operating cycle. Embodiments of each of the molding apparatus may form multi-layer articles in a thirty-two by thirty-two cavity stack. Embodiments of each of the molding apparatus may be configured to inject the inner and outer layer materials into the mold to form the skin of the resulting article or articles. Embodiments of the molding apparatus may further be configured to inject the interior layer material simultaneously with the inner and outer layer materials into the mold. Embodiments of the molding apparatus may be configured to cause the interior layer material to be injected so that it is offset from the zero velocity gradient of the combined flow of the first and second materials.

In some embodiments, a molded article may have an inner layer, an outer layer, and an interior layer extending between the inner and outer layers to at least 99% of the sealable portion of the article. In some embodiments, a molded article may have an inner plastic layer, an outer plastic layer, and an interior plastic layer extending between the inner and outer layers to provide a gas permeation rate of less than about 0.05 ppm/day/article when sealed. Embodiments of a molded article may exhibit gas permeation rates of less than about 0.005 ppm/day/article, or even less than about 0.0005 ppm/day/article when sealed. Embodiments of either of the foregoing articles may be symmetric. Embodiments of either of the foregoing articles may have a circular cross-section along any transverse plane extending along a sidewall thereof.

In any of the foregoing method, apparatus, article, or non-transitory computer readable program embodiments, the interior layer may be offset toward a surface of the molded article. The interior layer may be a first material and the inner and outer layers may be a different material. The interior layer may have a different composition from the material of the inner and outer layers. The inner and outer layers may be a plastic material suitable for injection molding. The interior layer may be substantially gas-impermeable relative to the permeability of the inner and outer layer materials. The interior layer may be a gas barrier material comprising a desiccant that absorbs moisture to counteract any increase in barrier material permeability caused by increased moisture content. The interior layer may be gas-scavenging relative to the scavengability of the inner and outer layer materials.

Other objects and advantages of the various embodiments will become apparent in view of the following detailed description of the embodiments and the accompanying drawings.

BRIEF DESCRIPTION OF THE DRAWINGS

FIG. 8 is a cross-sectional view of the fountain flow effect of a combined polymeric stream as it flows along an annular pathway of a mold cavity.

DETAILED DESCRIPTION OF EMBODIMENTS OF THE INVENTION

Figure 1:
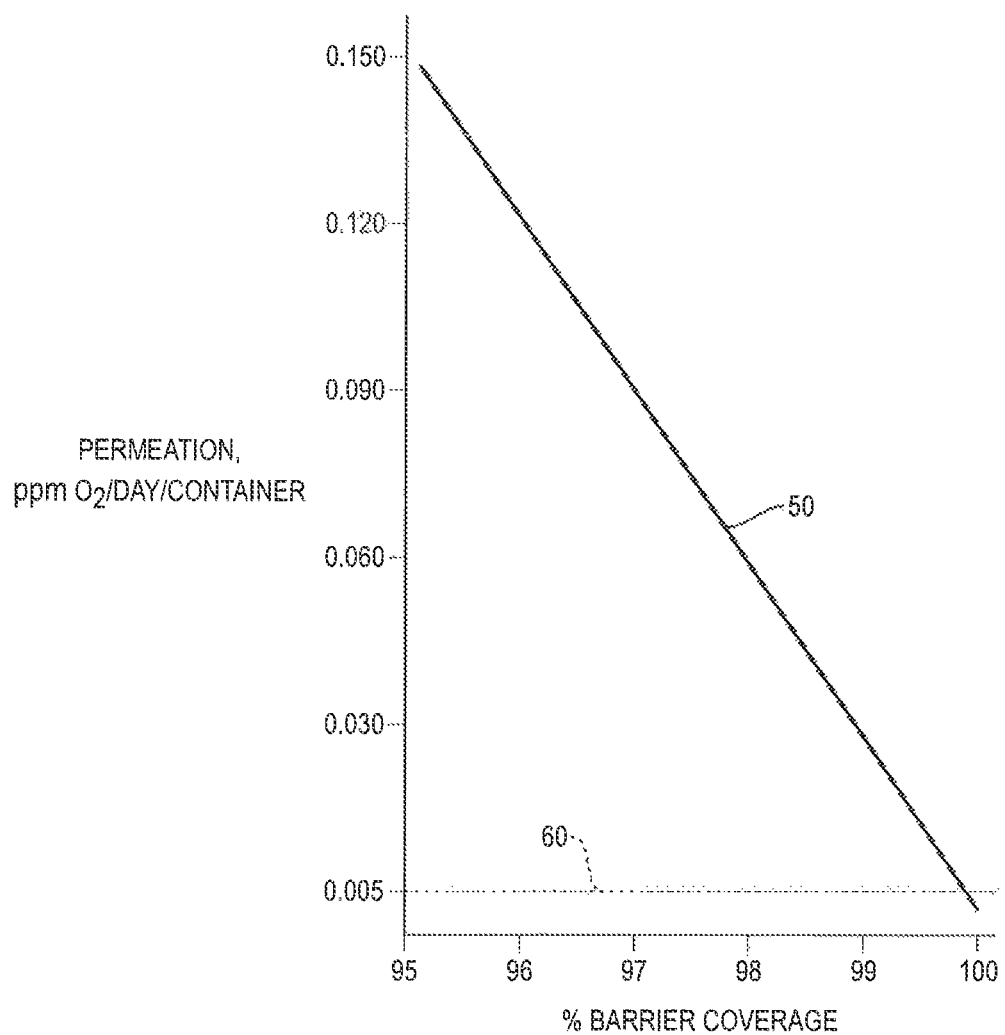
FIG. 1 is a schematic graph showing oxygen permeation as a function of barrier coverage.

FIG. 1 schematically shows an oxygen permeation curve 50 though the wall of a plastic co-injection molded article as a function of coverage of an interior barrier relative to the total exposed wall surface area of the sealable portion of the article. FIG. 1 also shows a target permeation rate 60 representing an optimal permeation to prevent undesirable degradation of the substance inside the sealed container. The interior layer materials associated with the FIG. 1 graph may consist of EVOH, MXD6 nylon or other passive barrier materials; EVOH, MXD6 nylon or other barrier materials, any of which has an oxygen scavenging component; or EVOH, MXD6 nylon or other barrier materials, any of which has a desiccant component. As can be seen in FIG. 1, more than 99% coverage is required to achieve the illustrated target permeation rate 60, which is 0.005 ppm $O_2$/day/container (ppm calculated on the basis of liquid content of the container). Though the target permeation rate 60 may depend upon the particular substance in the container, the container configuration, and desired storage life (as total permeation is a function of rate, exposed area, and time), the illustrated target permeation rate 60 is a rate typical of conventional food-containing articles. Further, while permeation rate is also dependent upon exposure conditions and to some extent, the wall thickness of the container, the permeation curve 50 is typical of conventional food containers under typical, if not favorable, storage conditions. Expected variations in the test parameters produced comparable results.

Depending on the food and the desired storage time (shelf life), the target permeation rate 60 may be an order of magnitude higher or lower than 0.005 ppm $O_2$/day/container, i.e., 0.05 or 0.0005 ppm $O_2$/day/container. The slope of the permeation curve 50 will differ with different types and thicknesses of interior layer materials, but one skilled in the art will appreciate that a significant increase in the permeation rate will occur with each 1% decrease in the barrier coverage of the container surface area.

Figure 2A:
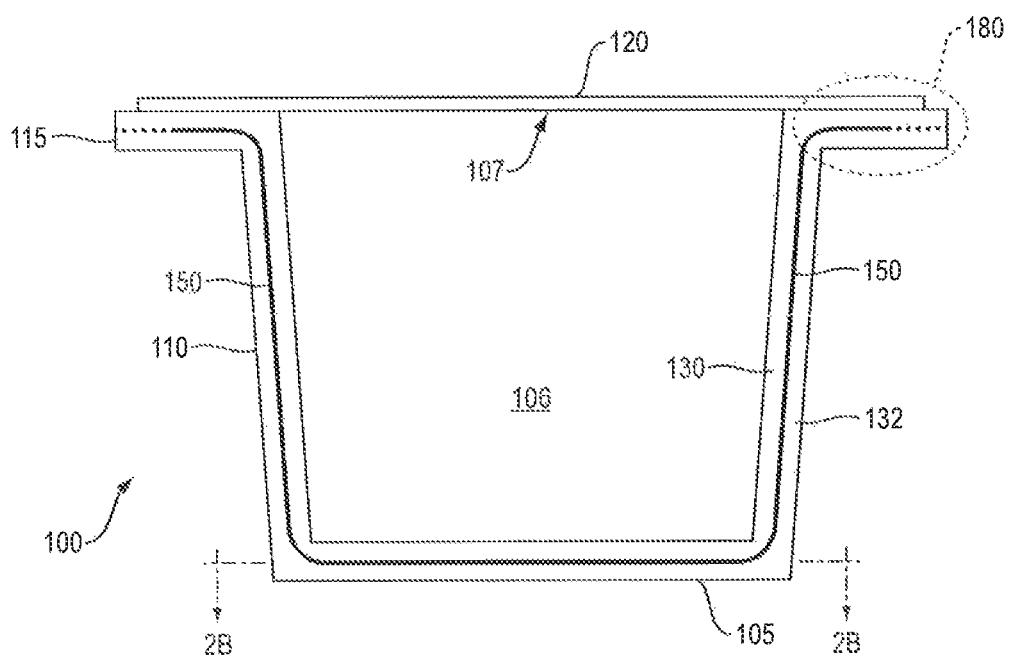
FIG. 2A is a cross-sectional view of an exemplary container according to various embodiments taught herein, but with the wall thickness of the container exaggerated for illustrative purposes.
Figure 2B:
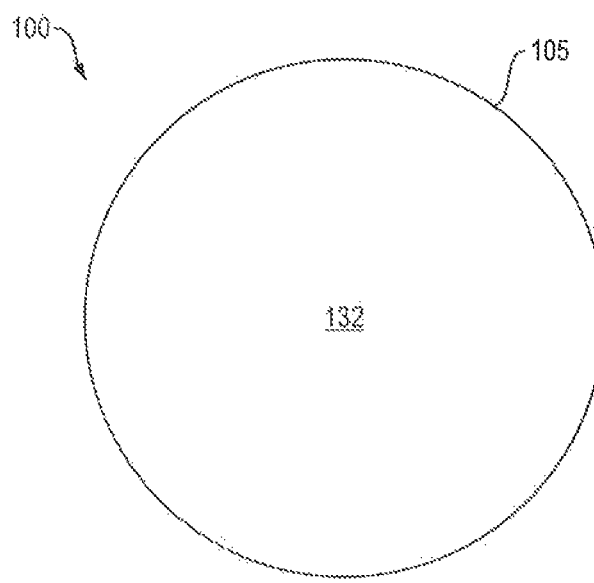
FIG. 2B is a cross-sectional view along a traverse plane of the exemplary container of FIG. 2A according to various embodiments taught herein.

Referring to FIG. 2A, a container 100 has a bottom 105, a sidewall 110 extending from the periphery of the bottom 105 to form a chamber 106, in this embodiment generally cup-shaped or U-shaped, having an open end 107, and a flange 115 extending from the periphery of the sidewall 110 at the open end 107 of the container. The container 100 in FIG. 2A is symmetrical, meaning that the cross-section of the container 100 along any transverse plane (i.e., extending horizontally in FIG. 2A) is either circular, i.e., through the bottom 105 or flange 115, or annular, i.e., through the sidewall 110. FIG. 2B illustrates an exemplary symmetrical cross-section, through the bottom 105 of the container 100 of FIG. 2A.

The container 100 includes a sealing zone 180 with a sealable surface. In this embodiment, the sealing zone 180 and its surface extends circumferentially about the open end 107. In this embodiment the sealing zone 180 and surface are formed in the flange 115. A closure 120, which may be of a conventional type, may be sealed to the flange 115 at the surface of sealing zone 180 by conventional methods, such as by heat-sealing, crimping, threading, and other known methods. Though the illustrative embodiment has a cup-like shape, the invention contemplates containers having alternative shapes or configurations in which the sealing zone 180 can be used to seal a portion of the container, which should be appreciated by those in the art. For example, if sidewall 110 had a lip, the lip could alternatively include the sealing zone and its surface. Further, though the embodiment of FIG. 2A has an open end 107 that may be closed by a closure 120, alternative embodiments with different open ends are contemplated. In the embodiment of FIG. 2, the surface area of the sealable portion of the molded article comprises the surface area of the base 105, the surface area of the sidewall 110, and the surface area of the portion of the flange 115 extending radially under the sealing zone 180 of the closure 120. The surface area of the sealable portion of alternative molded articles may be defined differently depending on their shapes or configurations and where they are sealed or intended to be sealed. For example, the surface area of the sealable portion of alternative container embodiments may not extend to a flange, but may instead, for example, extend only to the sealing zone in a lip of the sidewall.

The container 100 may be formed by co-injecting a first plastic material such as, for example, PET or PP and a second plastic material, such as, for example, EVOH, into a mold cavity configured to form a molded plastic article. The first plastic material forms an inner layer 130 and an outer layer 132, which together generally conform to the desired end shape of the container or article, accounting for manufacturing requirements (e.g., thermal expansion/contraction) as is known. The second plastic material forms an interior core layer 150. The interior core layer 150 may be a barrier layer, a gas scavenging layer, and/or a desiccant layer. Though PET, PP and EVOH are commonly used materials, it should be understood what other suitable materials may be used, and that the various embodiments are suitable for use with other polymeric materials.

As can be seen in FIG. 2A, the interior layer 150 extends substantially entirely throughout the container 100, but is substantially fully surrounded by the inner layer 130 and the outer layer 132. The inner layer 130 and the outer layer 132 are known as the skin. As used herein, the term "substantially" or "substantially fully" means 95%-100% coverage of the interior layer across the entire surface area of the container 100.

The gas barrier material of interior layer 150 may be EVOH or other suitable materials, which are known or may become known, that sufficiently prevent gases, for example, oxygen, from permeating through the container, i.e., from the outside to the inside and vice versa. As can be seen in the particular embodiment of FIG. 2A, the inner layer 150 extends into the flange 115.

As may be noted, the interior layer 150 in FIG. 2A does not extend to the end of the flange 115. However, those of ordinary skill in the art should appreciate that the exposed portion of the flange that does not contain the interior layer is an extremely small portion of overall exposed surface area of the container 100 (the thickness of the flange 115 in FIG. 1 being greatly exaggerated for illustration purposes). Thus, the desired degree of coverage, including high degrees of coverage (e.g., 99% or more), may be obtained without the interior layer 150 extending to the outer periphery of the flange 115. Put another way, the degree of coverage is most relevant to the sealable portion of the container 100 that is within the location where the closure 120 is sealed to the container, e.g., the seal contact surface. If an adequate degree of coverage is achieved within the seal contact surface, e.g., 99% coverage within the seal contact surface, desired permeation rates may be achieved. In the illustrated embodiment of FIG. 2A, for example, the interior layer 150 extends to or beyond the margin of the seal contact surface (in this container configuration the radially inward margin of the flange 115), and adequate coverage is obtained without the interior layer extending beyond that point. Nonetheless, the invention also may be utilized to provide the interior layer 150 to or nearly to the end of flange 115, beyond the seal contact surface margin, as depicted in dashed lines in FIG. 2A.

The interior layer 150 may be created by co-injecting an interior layer material with an inner and outer layer material. Such methods are generally known, such as described in U.S. Pat. No. 6,908,581 and the documents incorporated therein, each of which is also incorporated by reference herein in its entirety.

Figure 3:
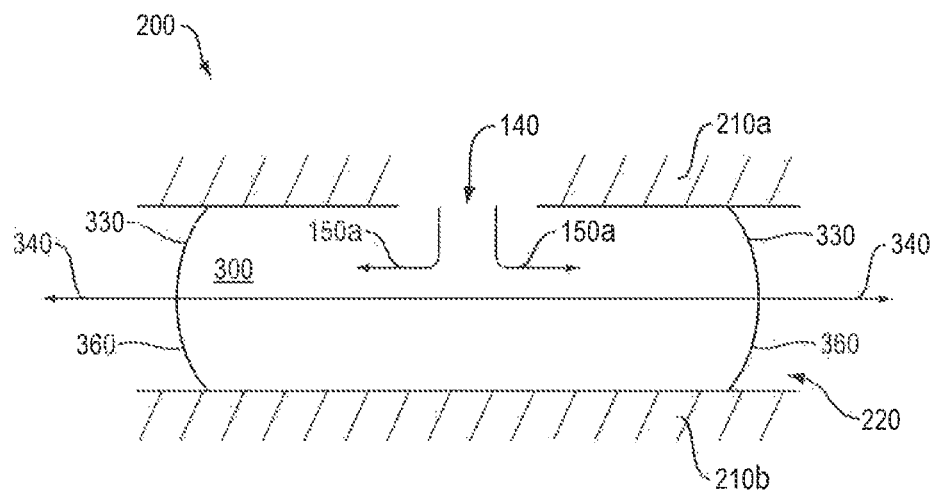
FIG. 3 is schematic cross-sectional view of a co-injection molding system according to various embodiments taught herein.

As shown schematically in FIG. 3, a mold 200 has mold portions 210a, 210b that form a mold cavity 220 therebetween. A combined flow 300 from a nozzle assembly is injected into the mold cavity 220 through an injection gate at gate injection location 140, and the combined flow 300, which in certain configurations may be an annular flow, flows from the injection location 140 through the mold cavity 220. The combined flow 300 is formed in the nozzle assembly. The nozzle assembly forms the combined flow 300 from the inner material, the outer material, and the interior material. The inner material forms an inner flow, the interior material forms an interior flow and the outer material forms an outer flow of the combined flow 300. The flow of the combined flow 300 forms a flow front 330 that moves through the mold cavity 220. At certain time segments of flow into the mold, the combined flow 300 may consist of two (inner and outer) materials or three (inner, outer, and interior) materials.

Figure 4:
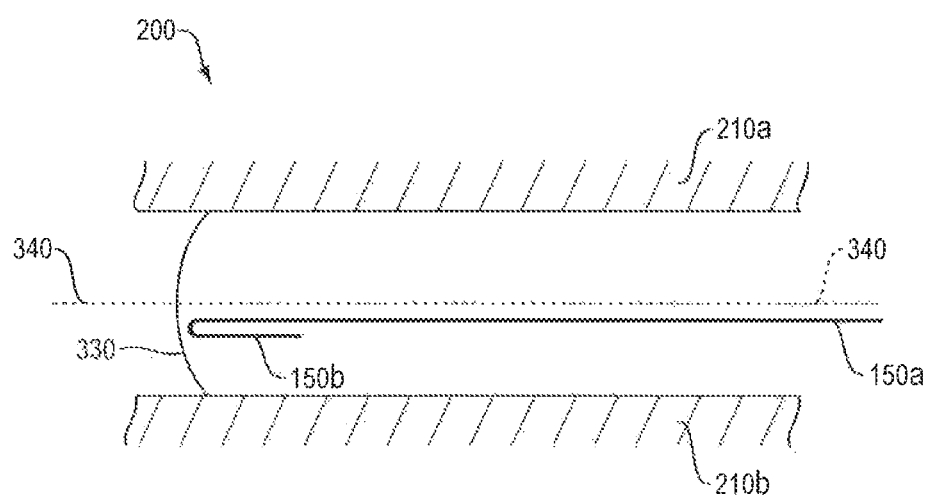
FIG. 4 is a schematic cross-sectional view of an exemplary material flow according to various embodiments taught herein.

The volumetric flow volume ratio of the inner flow to the outer flow forming the combined flow 300 is selected to cause the interior layer flow stream to flow along a streamline offset from the zero velocity gradient 340 ($V_{max}$) of the combined flow 300, yet on a streamline having a greater velocity than the average flow velocity ($V_{ave}$) 360. This prevents the interior layer material flow 150a from breaking through the flow front 330. Rather, as shown in FIG. 4, the interior layer material flow 150a folds over to form a fold over portion 150b behind the flow front 330 and remains encased by the inner and outer flows of the combined flow 300. By starting the interior layer material flow 150a offset from the zero velocity gradient or shifting the interior layer material flow 150a from the zero velocity gradient to a slower moving streamline that has a velocity that is greater that the average velocity, the interior layer can "catch up" to the fountain flow and fold over, creating a barrier or scavenger layer that extends through and provides barrier or scavenger protection over a range of between 95% and 100% coverage, or even between 99% and 100% coverage, throughout the sealable portion of the resulting molded plastic article. The interior layer may be located either inside or outside the location of the zero-velocity gradient creating fold over toward the inside or outside of the part, respectively.

The present inventor has discovered that such fold over techniques may unexpectedly be used to mitigate the above-mentioned systemic and process variations detrimentally present even in co-injected symmetric articles. For example, previously known techniques seek to prevent "gaps" in the barrier layer, e.g. caused by the interior layer material 150 failing to flow the end of the mold cavity, by controlling the injection parameters of the interior layer material 150 (e.g., injection timing, location, pressure, etc.) so that the interior layer material 150 does not lag behind flow front 330. However, as discussed above and in the aforementioned U.S. Pat. No. 6,908,581, this can cause the interior layer material flow 150a to break through the flow front 330. Conversely, conventional techniques attempt to avoid breakthrough by utilizing injection parameters that prevent the interior layer material flow 150a from catching up to (and breaking through) the flow front 330. This, though, can cause the interior layer material flow 150a to lag too far behind the flow front 330, resulting in inadequate barrier coverage. The inherent systemic and process variations effectively prevent this balance from being achieved using previously known techniques, producing breakthrough, lagging, or both.

Implementation of a fold over process can mitigate these issues. Using a fold over process, the injection parameters can be controlled so that interior layer material flow 150a reaches the end of the mold cavity, for example, a flange forming portion of the cavity, and consequently substantially throughout the resulting molded article without breakthrough concern.

Figure 5:
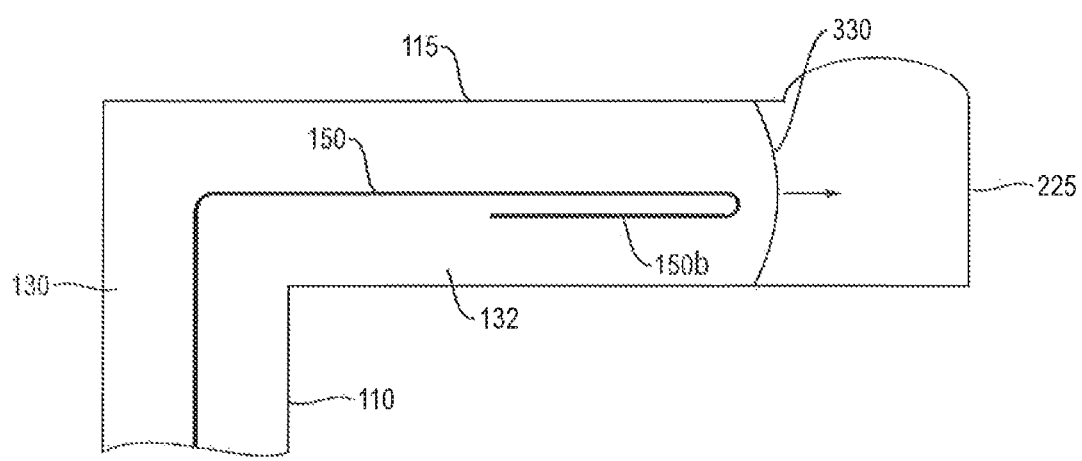
FIG. 5 is an enlarged view of the flange portion shown in FIG. 1.

As shown in FIG. 5, as the flow front 330 is approaching the distal end 225 of the flange forming portion of the cavity, the interior layer material flow 150a will simply continue to fold over 150b behind the flow front 330 to the degree necessary to accommodate the surplus interior layer material flow 150a. In this manner, a molded product with adequate barrier coverage, exceeding 99% in symmetric geometries, may be achieved.

Figure 6:
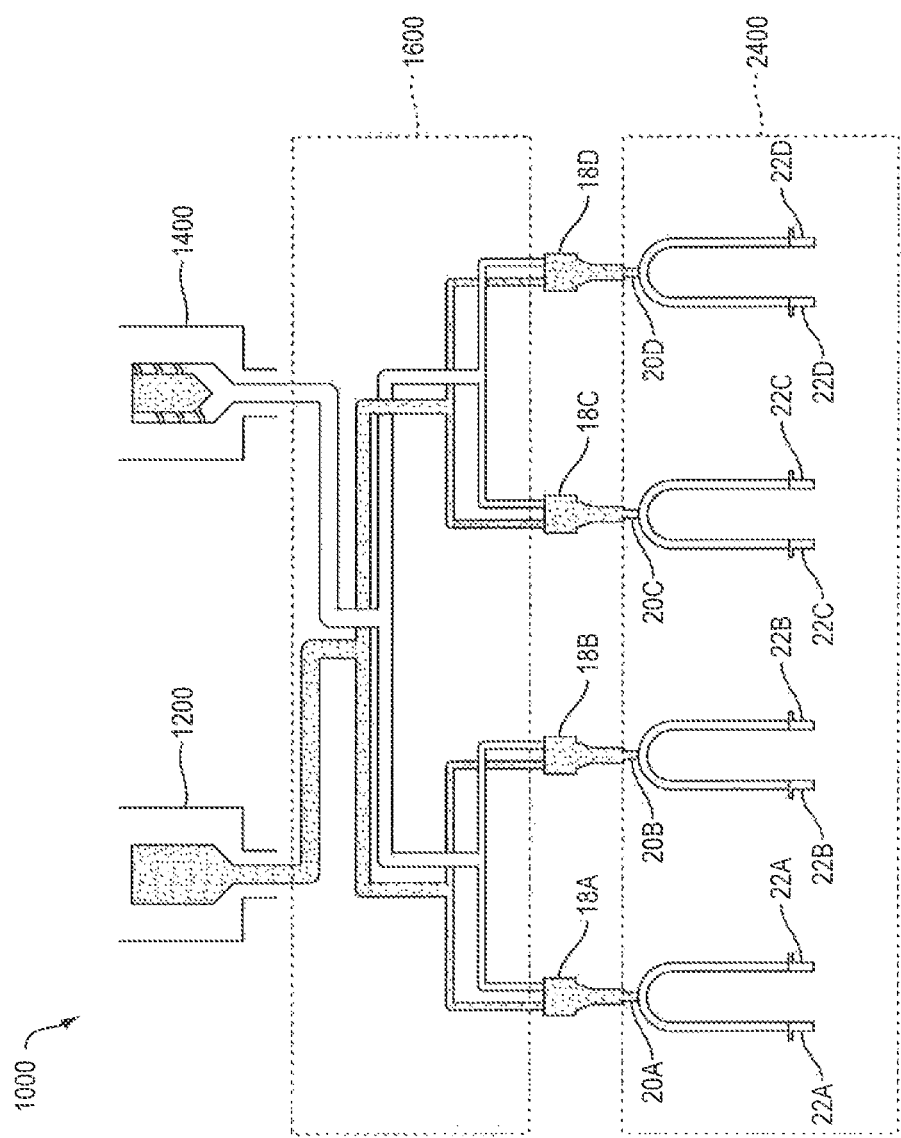
FIG. 6 depicts a cross-sectional view of an exemplary molding system according to various embodiments taught herein.

FIG. 6 illustrates an exemplary system suitable for practicing exemplary embodiments. Co-injection molding system 1000 is configured to inject at least two materials into a mold cavity. Materials suitable for use with the present invention include polymer based materials such as, Polyethylene Terephthalate (PET), ethylene vinyl alcohol (EVOH), MXD6 nylon, polypropylene (PP), and polycarbonates (PC). Co-injection molding system 1000 includes a first material source 1200, a second material source 1400, and a manifold 1600. Manifold 1600 may consist of separate manifolds for each polymeric material. Co-injection molding system 1000 further includes nozzle assemblies 18A, 18B, 18C, 18D and mold 2400. Mold 2400 includes gates 20A, 20B, 20C, 20D, and cavities 22A, 22B, 22C, 22D. In FIG. 6, each nozzle assembly (18A, 18B, 18C, and 18D) has a corresponding gate and cavity. For example, nozzle assembly 18A corresponds to gate 20A and cavity 22A.

A first polymeric material is extruded from the first material source 1200 and a second polymeric material is extruded from the second material source 1400 into the manifold 1600 for combining in nozzles 18A-18D before being injected into mold cavities 22A, 22B, 22C, 22D. The first and second polymeric streams are combined to form an annular combined polymeric stream such that the first polymeric material forms an interior core stream in the combined polymeric stream while the second polymeric material forms the inner and outer streams in the combined stream. The inner and outer streams encase the interior core stream as the annular combined polymeric stream is injected from the nozzle.

Figure 7:
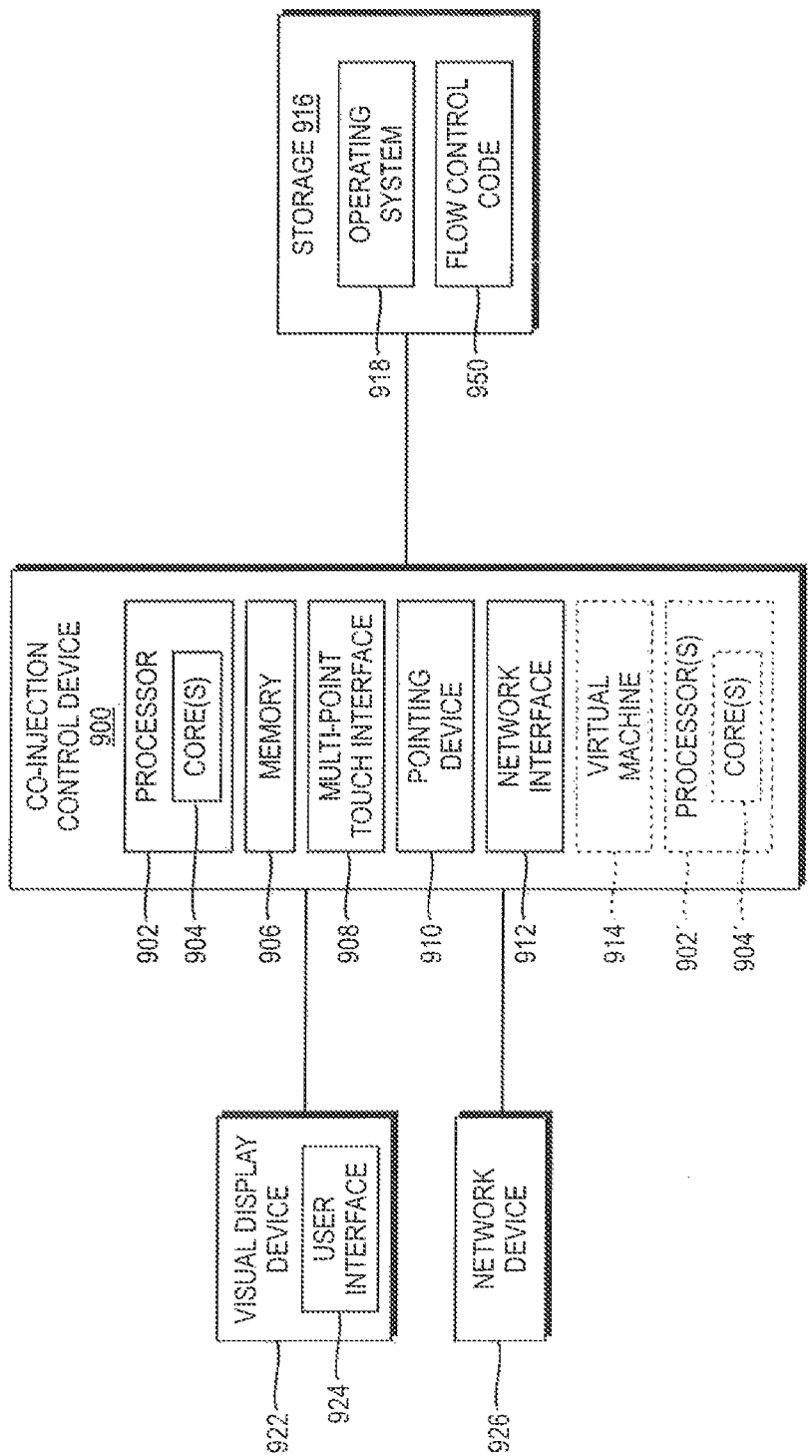
FIG. 7 illustrates an exemplary computing environment suitable for practicing exemplary embodiments taught herein.

FIG. 7 illustrates an exemplary computing environment suitable for practicing exemplary embodiments taught herein. The environment may include a co-injection control device 900 coupled, wired, wirelessly or a hybrid of wired and wirelessly, to co-injection system 1000. The co-injection control device 900 is programmable to implement executable Barrier Coverage Code 950 for forming a barrier layer and/or scavenger layer that provides coverage over a range of between 95% and 100%, or even between 99% and 100%, of a symmetric container or symmetric cap surface area as taught herein. Co-injection control device 900 includes one or more computer-readable media for storing one or more computer-executable instructions or software for implementing exemplary embodiments. The computer-readable media may include, but are not limited to, one or more types of hardware memory, non-transitory tangible media, etc. For example, memory 906 included in the co-injection control device 900 may store computer-executable instructions or software, e.g., instructions for implementing and processing every module of the executable Barrier Coverage Code 950. Co-injection control device 900 also includes processor 902 and, one or more processor(s) 902' for executing software stored in the memory 906, and other programs for controlling system hardware. Processor 902 and processor(s) 902' each can be a single core processor or multiple core (904 and 904') processor.

Virtualization may be employed in co-injection control device 900 so that infrastructure and resources in the computing device can be shared dynamically. Virtualized processors may also be used with the executable Barrier Coverage Code 950 and other software in storage 916. A virtual machine 914 may be provided to handle a process running on multiple processors so that the process appears to be using only one computing resource rather than multiple. Multiple virtual machines can also be used with one processor.

Memory 906 may comprise a computer system memory or random access memory, such as DRAM, SRAM, EDO RAM, etc. Memory 906 may comprise other types of memory as well, or combinations thereof.

A user may interact with co-injection control device 900 through a visual display device 922, such as a computer monitor, which may display the user interfaces 924 or any other interface. The visual display device 922 may also display other aspects or elements of exemplary embodiments, e.g. the databases, the enrollment forms, the medication guide, etc. Co-injection control device 900 may include other I/O devices such a keyboard or a multi-point touch interface 908 and a pointing device 910, for example a mouse, for receiving input from a user. The keyboard 908 and the pointing device 910 may be connected to the visual display device 922. Co-injection control device 900 may include other suitable conventional I/O peripherals. Co-injection control device 900 may further comprise a storage device 916, such as a hard-drive, CD-ROM, or other non-transitory computer readable media, for storing an operating system 918 and other related software, and for storing executable Barrier Coverage Code 950.

Co-injection control device 900 may include a network interface 912 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 912 may comprise a built-in network adapter, network interface card, PCMCIA network card, card bus network adapter, wireless network adapter, USB network adapter, modem or any other device suitable for interfacing authorization computing device 900 to any type of network capable of communication and performing the operations described herein. Moreover, co-injection control device 900 may be any computer system such as a workstation, desktop computer, server, laptop, handheld computer or other form of computing or telecommunications device that is capable of communication and that has sufficient processor power and memory capacity to perform the operations described herein.

Co-injection control device 900 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Barrier Coverage Code 950 includes executable code executable by the processor 902 to control the co-injection system 1000 to selectively control a volumetric flow volume of the inner and outer polymeric streams, control a position of the interior core material stream 150*a* relative to a velocity flow front of the combined polymeric stream and control extrusion start time of the interior core stream relative to the extrusion start time of the inner and outer polymeric streams as taught herein. That is, Barrier Coverage Code 950 includes executable code executable by the processor 902 to control the co-injection system 1000 to place the interior core material flow stream 150*a* on a flow streamline that has a velocity that is greater that the average velocity of the combined annular flow 300. Thus, the interior layer material flow 150*a* can "catch up" to the fountain flow and fold over, creating coverage of a barrier layer or scavenger layer in the resulting molded article in a range of between 95% and 100%, or even between 99% and 100%, of the sealable portion. Execution of the Barrier Coverage Code 950 by the processor 902 allows the co-injection system 1000 to place the interior layer material flow 150*a* either inside or outside the location of the zero-velocity gradient creating fold over toward the inside or outside of the resulting article, respectively. Methods and co-injection systems taught herein facilitate the co-injection molding of food or beverage containers whereby the interior core stream forms a structural element that secures the interior core layer to the inner layer or the outer layer to prevent delamination of the resulting molded plastic article and create visual effects in the resulting molded plastic article without the need for adhesive compounded into the polymeric materials used to form the resulting molded plastic article.

FIG. 8 depicts the fountain flow effects whereby flowing material upstream of the flow-front 23 has a velocity gradient 350 such that the flow velocity is fastest in the middle and slowest at or near the interface of the polymeric stream and the walls of the channels of the mold cavity.

Figure 9A:
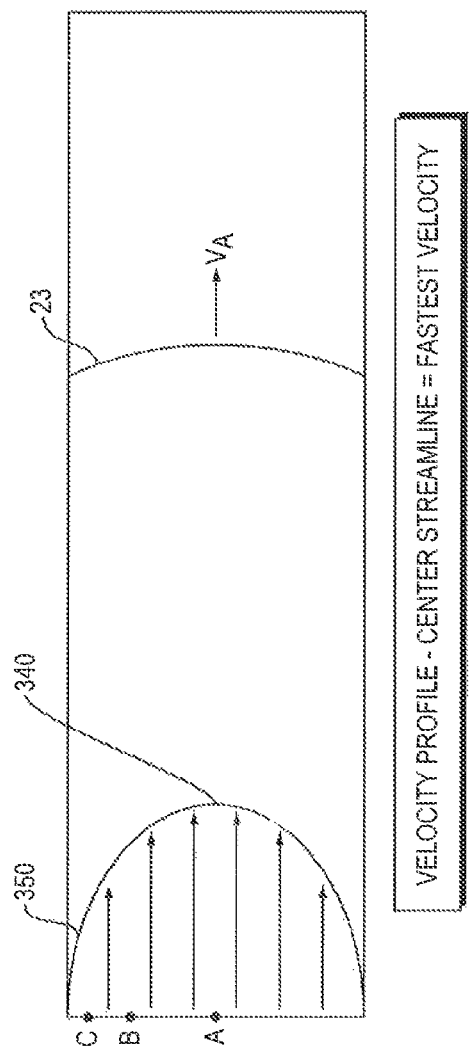
FIGS. 9A and 9B are cross-sectional views of the velocity profile of the combined annular flow of the polymeric stream and the relative velocity differences across the flow gradient of the combined polymeric stream.
Figure 9B:
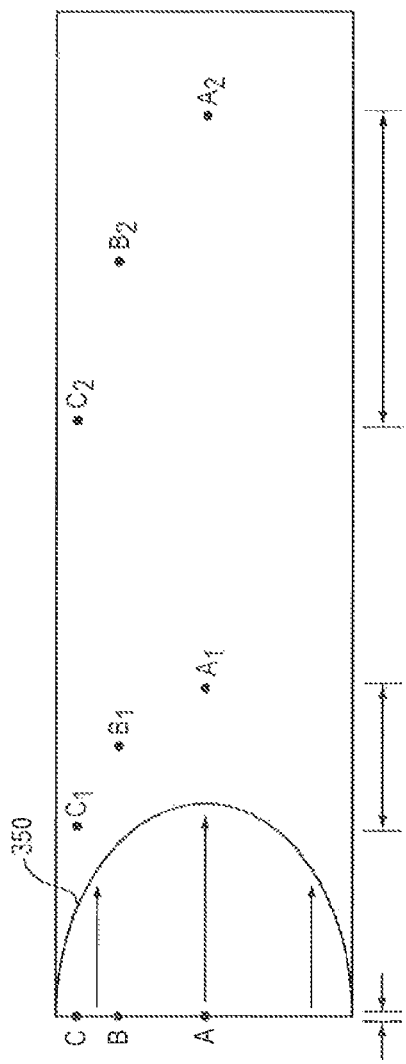

FIGS. 9A and 9B depict the velocity gradient 350, where the combined stream is fastest at point "A" and slower at points "B" or "C". The zero-velocity gradient 340 occurs at the point where the velocity of the flow is greatest. Because the flow velocity at the zero-velocity gradient streamline is greater than the average velocity of the flow-front, the interior material injected at or near the zero velocity gradient point can, under some circumstances "catch up" to and pass the flow-front and break through the skin, even if injection of the interior material begins after injection of the inner and outer layers (PET, PC, or PP). The interior core stream material will breakthrough when the interior material reaches the flow-front of the polymeric stream.

FIG. 9B shows that as the particles initially at points A, B, and C respectively move downstream, they move farther apart from each other due to velocity gradient 350. After a first period of time elapses, the particles will have moved to new locations designated as $A_1$, $B_1$, and $C_1$ respectively. After a second period of time elapses, the particles will have moved from locations designated as $A_1$, $B_1$, and $C_1$ to new locations designated as $A_2$, $B_2$, and $C_2$ respectively. The relative location of the particles at the successive times demonstrates the effect of the velocity gradient 350 over time. Since flow velocity at point A is greater than the velocity at point B, the particle starting at point A will move farther over time than the particle starting at point B. Similarly, since flow velocity at point B is greater than the velocity at point C, the particle starting at point B will move farther over time than the particle starting at point C.

Figure 9C:
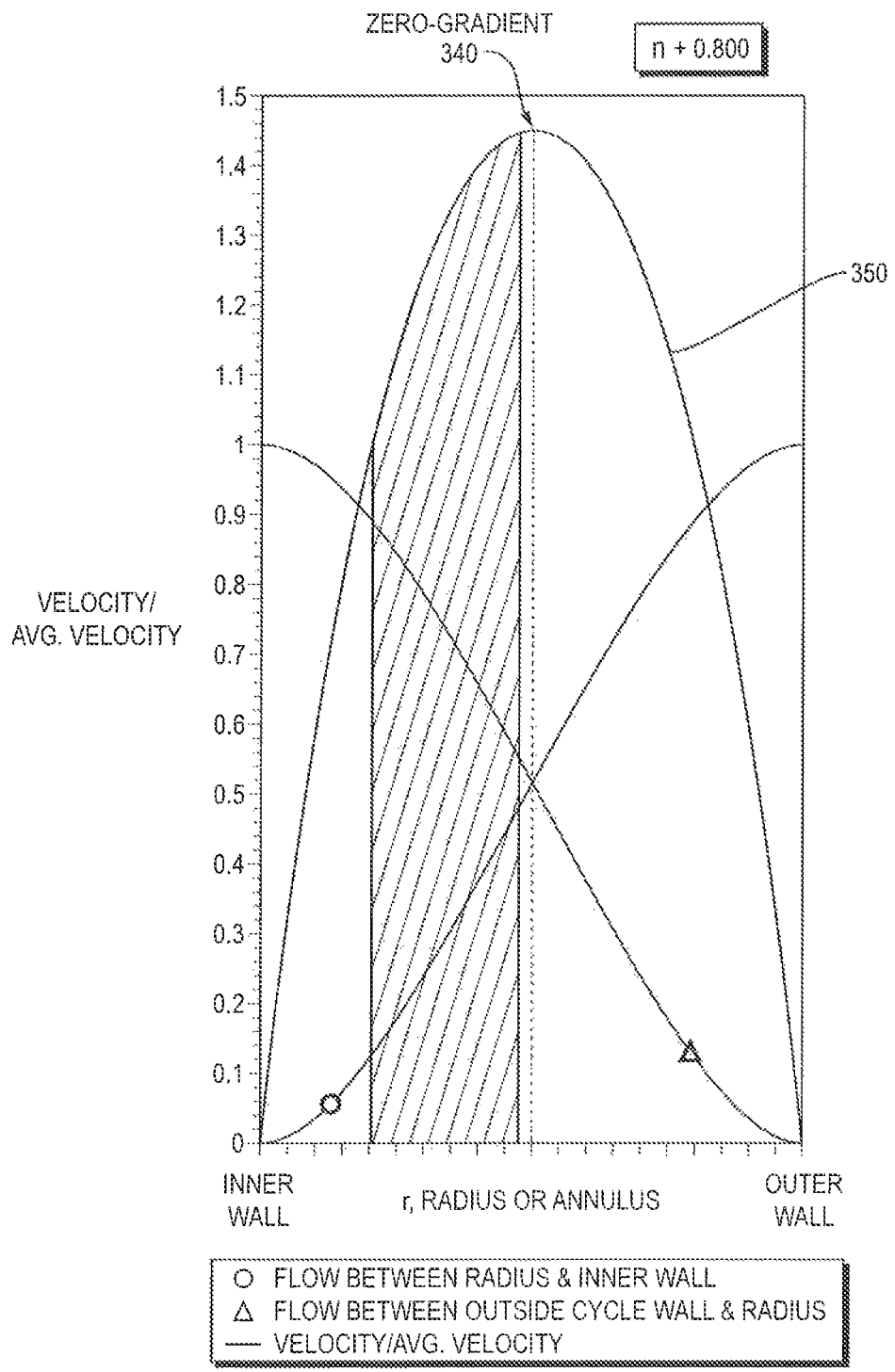
FIG. 9C is a graph illustrating resulting flow fraction and velocity profile curves across the annular channel within a nozzle such as in FIG. 6 for a plastic flow stream—the ordinate plotting the ratio of flow velocity-to-average velocity as a function of the radius of the annulus between the inner and outer flow channel walls, with the central solid line curve 23 plotting the ratio and showing zero gradient for the combined flow stream CF, the curve designated with a circle marker plotting the inner flow IF between the radius and the inner cylindrical wall T from the inner to the outer wall, and the curve marked with a triangle plotting the outer flow OF between the outer cylindrical wall and the annular radius.

FIG. 9C depicts the normalized velocity profile 350 and volume fraction inside and outside for a fluid with n=0.8 (where n is the parameter for the non-Newtonian power law model of fluid flow). The hatched area shows the acceptable location for interior layer placement that is both greater than the average velocity and off the zero velocity gradient 340. This area will wrap the layer to the inside of the part. From the graph we can see that the flow fraction of the inside layer can be in a range from 0.1 to 0.45. The flow fraction of the outside layer can be from 0.9 to 0.55. The interior layer thickness can be as thick as about 25% of the thickness of the flowing layer which is about 35% of the flow fraction, 0.1 to 0.45.

Figure 10:
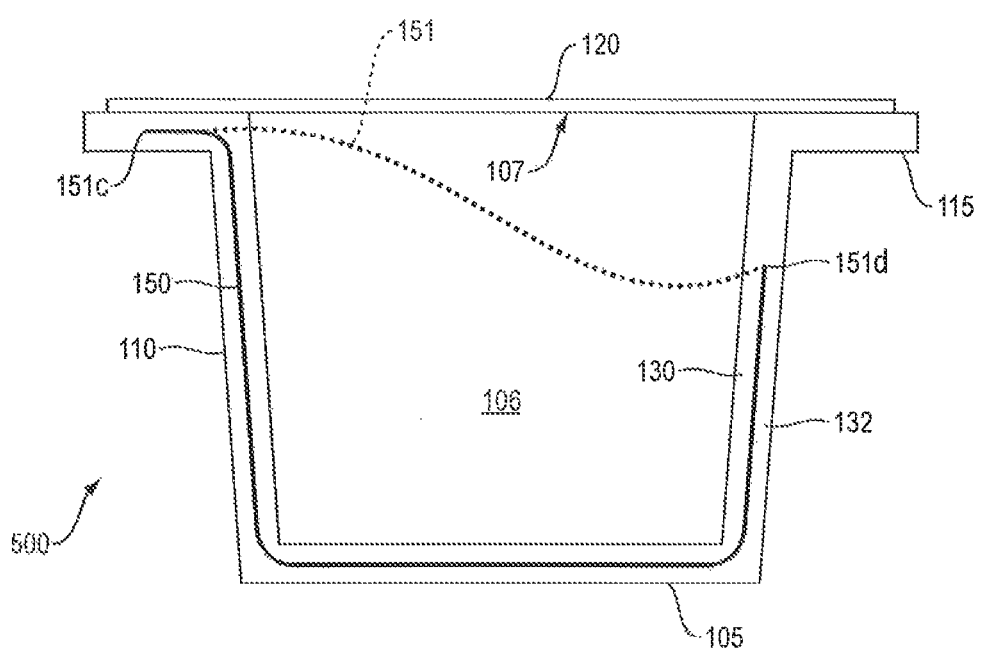
FIG. 10 is a cross-sectional view of an exemplary prior art container with the wall thickness of the container exaggerated for illustrative purposes.

FIG. 10 is a cross-section of a container 500 with the leading edge 151 of the interior layer having a position typically achieved by the prior art. The leading edge 151 of interior layer 150 has an advanced portion 151c and a lagging portion 151d. The leading edge 151 of interior layer 150 does not reach a portion of the sealing area of the molded container 500, which may be significant. The interior layer 150 of a prior art container 500 formed under typical production conditions, such as in a mold defining four or more cavities, does not extend to 95%, and often much less than 95%, of the surface area of the sealable portion of the container. The sealable portion of the container 500 includes the base 105, the sidewall 110, and the sealing zone within the flange 115. When the entire surface of the prior art container 500 is considered, the portion of the surface area lacking an interior layer is even greater. The highest interior layer coverage in the prior art was only achieved under the best conditions including, for example, the use of a mold defining a single symmetrical cavity operating at longer cycle times. The coverage of the interior layer 150 of a prior art container 500 formed under the best conditions, however, still does not match that of containers in accordance with embodiments taught herein. As shown in FIG. 1, the typical position of interior layer 150 of the prior art container will allow high permeation into the sealed container.

Economical containers require the use of multi-cavity molds operating at fast cycle times. Production molding methods and systems use molds ranging from four cavities to a thirty-two by thirty-two cavity stack (64 cavities total) operating at cycle times of about 5 to 10 seconds. Most systems have cycle times of 5 to 7 seconds depending on part wall thickness. With the prior art, non-uniformities of polymer material temperatures, hot runner temperatures and dimensions, mold cavity temperatures and dimensions, and other factors prevent uniform combined flow into the mold cavity, resulting in a non-uniform position of the leading edge 151 of the interior layer 150.

Figure 11:
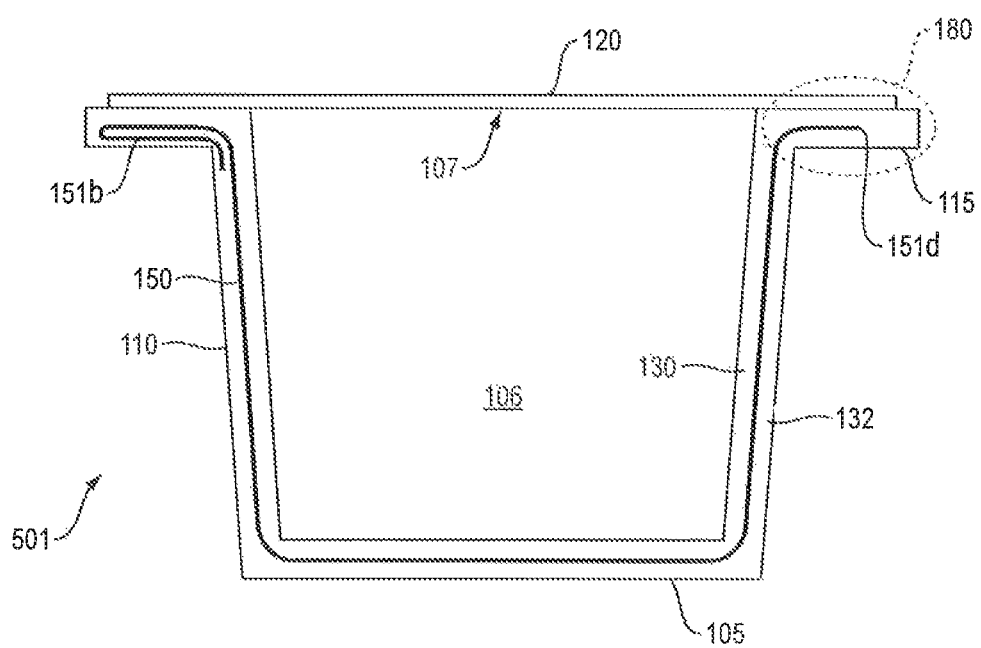
FIG. 11 is a cross-sectional view of an exemplary container according to various embodiments taught herein, but with the wall thickness of the container exaggerated for illustrative purposes.

FIG. 11 is a cross-section of a container 501 with a leading edge 151 of an interior layer 150 having a position consistent with embodiments taught herein. FIG. 11 shows the beneficial effect of using an offset in accordance with embodiments taught herein to create a foldover 151b when molding parts with the same non-uniformities as described with respect to the prior art. By offsetting the interior layer 150 from the zero-gradient of the combined flow, the more advanced portion 151c of the interior layer leading edge 151 will begin to foldover without breaking through the flow front. This foldover 151b of the advanced portion 151c of the interior leading edge will allow the lagging portion 151d to reach the flange and provide sufficient radial coverage of the interior layer 150 with respect to the sealing area of the closure 120.

In production molding using multi-cavity molding systems, the sum of the non-uniformities in one cavity to any other cavity are different, resulting in different levels in the advanced portion and the lagging portion of the interior layer's leading edge. Embodiments taught herein overcome the problem of different sums of non-uniformity by creating more or less foldover in any one cavity such that the lagging portion of the interior layer's leading edge in the most lagging cavity will reach the required radial position with respect to closure 120. Embodiments taught herein enable production with molds including four or more cavities, and at cycle times substantially as fast as monolayer molding, while achieving the interior layer leading edge position needed to provide the target percentage barrier coverage, for example, for food containers.

Figure 12:
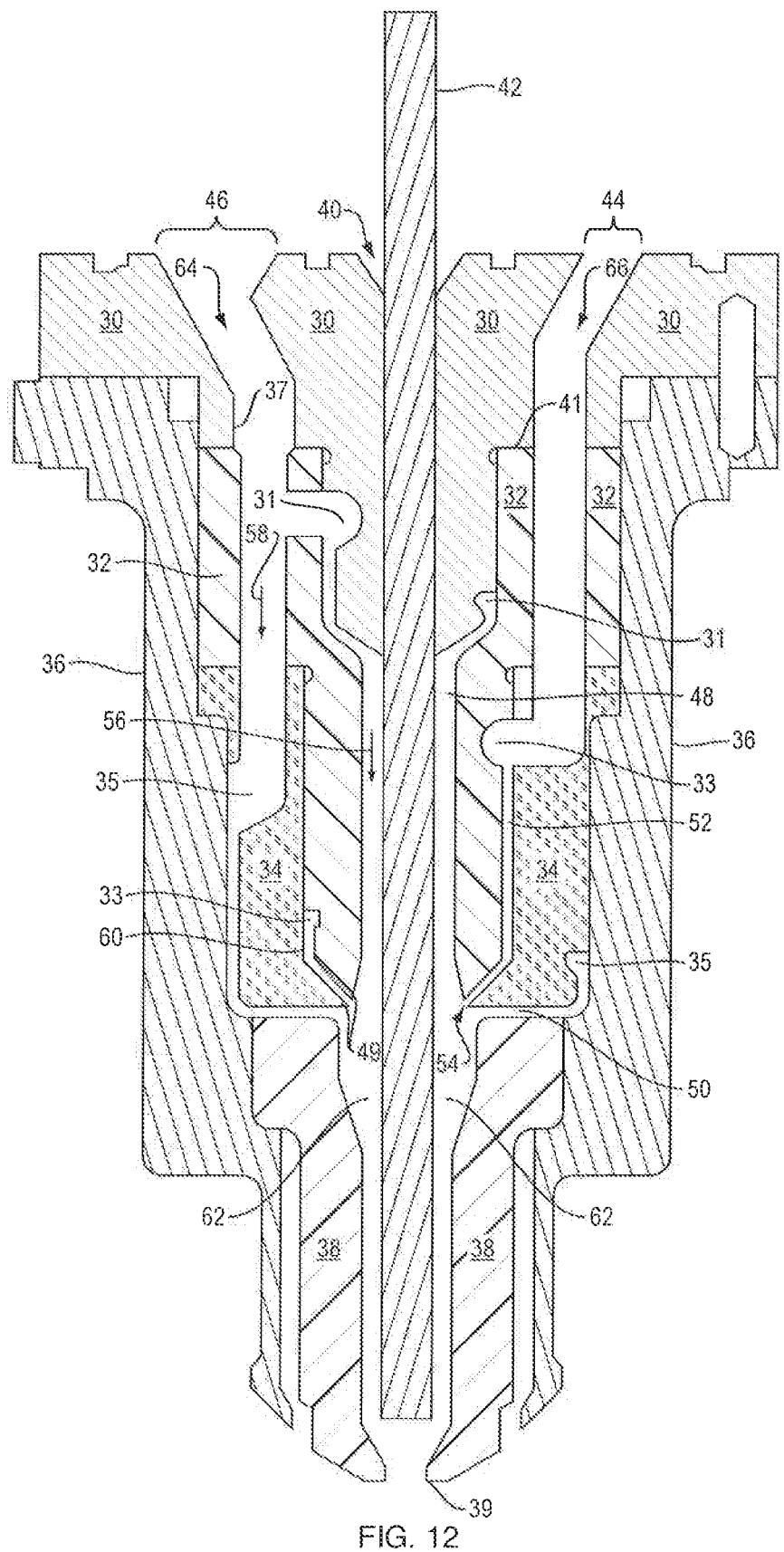
FIG. 12 depicts an exemplary nozzle assembly suitable for practicing embodiments taught herein.

FIG. 12 illustrates an exemplary nozzle assembly suitable for practicing the embodiment taught herein. Nozzle assembly 18 includes an inner combining means 30, a middle combining means 32, and an outer combining means 34. Nozzle assembly 18 further includes nozzle body 36 and nozzle tip 38. Inner combining means 30, middle combining means 32, outer combining means 34, nozzle body 36, and nozzle tip 38 cooperatively combine to form a number of conical, annular, and axial passages and channels in nozzle assembly 18. The nozzle assembly 18 is well suited for use in a co-injecting system, for example system 1000, for forming a plastic object having two or more layers.

Inner combining means 30 includes a first inlet 46 to receive a first polymeric material 64, such as a skin material (i.e., inner and outer layer material), and a second inlet 44 to receive a second polymeric material 66, such as a core material (i.e., interior layer material). The inner combining means 30 further includes a through bore 40 configured to receive a valve pin 42. The through bore 40 extends through the middle combining means 32, and through a portion of the outer combining means 34 to allow the valve pin 42 to move in an axial direction along a longitudinal axis of the nozzle assembly 18. Through bore 40 has an inner wall diameter that varies along a central longitudinal axis of the nozzle assembly 18. Valve pin 42 is movable in an axial direction along the central longitudinal axis of nozzle assembly 18 to assist in controlling the flow of the first polymeric material 64 and second polymeric material 66 through nozzle assembly 18 and into mold 24.

Middle combining means 32 cooperatively engages with the inner combining means 30 form a portion of the plurality of annular flow channels in nozzle assembly 18. Middle combining means 32 receives from channel 37 the first polymeric material 64 and receives from channel 41 the second polymeric material 66 to manipulate the flow of each of the polymeric materials through a plurality of annular fluid carrying passages or channels. The flow manipulation carried out by middle combining means 32 initiates the creation of an outer material stream 58 and an inner material stream 56 that together encapsulate an interior material stream 60.

The middle combining means 32 when coupled with the inner combining means 30 forms a wrapped-coat-hanger die 31 that circumferentially extends around the through bore 40 and valve pin 42. Wrapped-coat-hanger die 31 provides annular fluid flow passage 48 with a uniform melt distribution of the first polymeric material 64. Annular fluid flow passage 48 channels an annular flow stream of the inner material stream 56 into stream combination area 54 through an orifice.

Outer combining means 34 cooperatively engages with middle combining means 32 to form one or more fluid carrying passages or channels to manipulate the second polymeric material 66 forming an interior layer of the resulting plastic object. The outer combining means 34 when coupled with the middle combining means 32 forms a wrapped-coat-hanger die 33 that circumferentially extends around inner material stream 56, through bore 40, and valve pin 42. Wrapped-coat-hanger die 33 provides conical fluid flow passage 52 with a uniform melt distribution of the second polymeric material 66. Conical flow passage 52 feeds an annular stream of the second polymeric material 66 into stream combination area 54 through another orifice.

The outer combining means 34 cooperatively engages with nozzle body 36. The outer combining means 34 when coupled with the nozzle body 36 forms wrapped-coat-hanger die 35 that circumferentially extends around the interior layer stream 52, the inner layer stream 56, the through bore 40, and the valve pin 42. Wrapped-coat-hanger die 35 provides radial fluid flow passage 50 with a uniform melt distribution of the first polymeric material 64. Radial fluid flow passage 50 feeds stream combination area 54 with a flow of first polymeric material 64 through an orifice. The first polymeric material 64 fed into the stream combination area 54 through the orifice forms the outer layer of a resulting molded object.

Fluid flow passages 48, 50, and 52 feed stream combination area 54 with the outer material stream 58, the inner material stream 56, and the interior material stream 60. A portion of the nozzle tip 38, a portion of the outer combining means 34, a portion of the middle combining means 32, and a portion of the valve pin 42, in combination form the stream combination area 54. Stream combination area 54 has an inner passageway diameter of between about 6.7 mm and about 17.2 mm. Stream combination area 54 combines in a simultaneous or near simultaneous manner the outer material stream 58 received from the fluid flow passage 50, the inner material stream 56 received from the fluid flow passage 48, and the interior material stream 60 received from the fluid flow passage 52 to form annular output stream.

The channels, bores and passageways of the inner combining means 30, the middle combining means 32 and the outer combining means 34 and more specifically the channels, bores and passageways associated with the formation and the flow of inner and outer layer material in the nozzle assembly 18 may be sized, defined, adapted and configured to control or produce a desired volumetric flow ratio as discussed above. In this manner, the valve pin 42 may remain in a fixed position and does not need to be moved to control or form a particular volumetric flow ratio. In other words, the nozzle assembly 18 has a channel configuration and structure to output a desired or selected volumetric flow ratio without the need of an associated controller or microprocessor. In some exemplary embodiments, the valve pin 42 may be controlled by a controller or microprocessor to control the volumetric flow ratio.

The annular output stream 49 flows from the stream combination area 54 through fluid flow passage 62 to output portion 39 of nozzle assembly 18. Fluid flow passage 62 has an annular inner passage that radially extends about through bore 40 and axially extends from the stream combination area 54 to the output portion 39. The output portion 39 communicates with a gate of a mold, such as one of gates 20A-20D.

The annular output stream 49 formed by the stream combination area 54 has an outer annular skin layer and an inner annular skill) layer formed of the first polymeric material 64, and an interior or core annular layer formed of the second polymeric material 66. The inner and outer skin layers of the first polymeric material 64 each have a substantially like cross sectional area as the materials flow through the fluid flow passage 62 to the output portion 39. The inner and outer skin layers of the first polymeric material 64 encapsulate the interior layer of the second polymeric material 66, which forms a core portion of a resulting plastic object.

Figure 13:
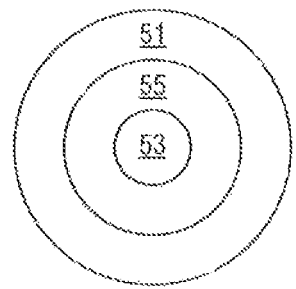
FIG. 13 depicts a cross-sectional view of an exemplary combined material stream according to various embodiments taught herein.

Upon injection from the nozzle assembly 18, the combined polymeric stream 49, as depicted in FIG. 13, comprises an interior stream 55 that flows along concentric or annular streamlines between the inner 53 and outer 51 polymeric streams.

As may be recognized by those of ordinary skill in the pertinent art based on the teachings herein, numerous changes and modifications may be made to the above-described and other embodiments of the present disclosure without departing from the spirit of the invention as defined in the appended claims. Accordingly, this detailed description of embodiments is to be taken in an illustrative, as opposed to a limiting, sense.

What is claimed is:

1. A method of molding a plurality of multi-layer articles, comprising:
    injecting a first polymeric material into a mold defining a plurality of at least four cavities and configured to form a plurality of at least four resulting multi-layer articles, wherein each of the plurality of cavities corresponds to one of the plurality of resulting multi-layer articles;
    injecting a second polymeric material into the mold to form an inner layer and an outer layer of each of the plurality of resulting multi-layer articles, wherein the first polymeric material is relatively more gas impermeable than the second polymeric material; and
    causing the first polymeric material to flow throughout the mold to provide each of the plurality of resulting multi-layer articles with an interior layer extending through at least 95% of a sealable portion of the resulting multi-layer article.

2. A method as defined in claim 1, wherein the first polymeric material and the second polymeric material are co-injected into the mold.

3. A method as defined in claim 1, wherein the first polymeric material and the second polymeric material comprise different materials.

4. A method as defined in claim 1, wherein the first polymeric material comprises ethyl vinyl alcohol.

5. A method as defined in claim 1, further comprising co-injecting the first polymeric material so that the first polymeric material remains offset from a zero velocity gradient throughout the mold.

6. A method as defined in claim 1, further comprising causing the first polymeric material to flow through the mold at a greater velocity than an average velocity of a combined flow of the first polymer material and the second polymeric material in the mold.

7. A method as defined in claim 1, wherein each of the plurality of cavities of the mold is substantially symmetric and each of the plurality of resulting multi-layer articles has a symmetric shape.

8. A method as defined in claim 7, wherein each of plurality of resulting symmetrical articles has a symmetrical geometry across any transverse plane.

9. A method as defined in claim 1, wherein initiation of injection of the first polymeric material into the mold occurs after initiation of injection of the second polymeric material into the mold.

10. A method as defined in claim 1, wherein the causing step further comprises causing the first polymeric material to flow throughout the mold to provide each of the plurality of resulting multi-layer articles with an interior layer extending through at least 99% of the sealable portion.

11. A method of molding a multi-layer article, comprising:
injecting a first polymeric material into a mold defining a cavity and configured to form a resulting multi-layer article;
injecting a second polymeric material into the mold to form an inner layer and an outer layer of the resulting multi-layer article, wherein the first polymeric material is relatively more gas impermeable than the second polymeric material; and
causing the first polymeric material to flow throughout the mold to provide the resulting multi-layer article with an interior layer extending through at least 99% of a sealable portion of the resulting multi-layer article.

12. A method as defined in claim 11, wherein the first polymeric material and the second polymeric material are co-injected into the mold.

13. A method as defined in claim 11, wherein the first polymeric material and the second polymeric material comprise different materials.

14. A method as defined in claim 11, wherein the first polymeric material comprises ethyl vinyl alcohol.

15. A method as defined in claim 11, further comprising co-injecting the first polymeric material so that the first polymeric material remains offset from a zero velocity gradient throughout the mold.

16. A method as defined in claim 11, further comprising causing the first polymeric material to flow through the mold at a greater velocity than an average velocity of the combined material flow.

17. A method as defined in claim 11, wherein the cavity of the mold is substantially symmetric and the resulting multi-layer article has a symmetric shape.

18. A method as defined in claim 11, wherein the resulting symmetrical article has a symmetrical geometry across any transverse plane.

19. A method as defined in claim 11, wherein injecting the first polymeric material into the mold begins after the step of injecting the second polymeric material into the mold has already begun.

20. A method as defined in claim 1, wherein each of the plurality of cavities has an asymmetric shape and each of the plurality of resulting multi-layer articles has an asymmetric shape.

21. A method as defined in claim 11, wherein the cavity of the mold has an asymmetric shape and the resulting multi-layer article has an asymmetric shape.

* * * * *